US006196269B1

(12) United States Patent
Michael et al.

(10) Patent No.: US 6,196,269 B1
(45) Date of Patent: Mar. 6, 2001

(54) CONVEYING INJECTOR

(75) Inventors: Hans Peter Michael; Gerald Haas, both of St. Gallen (CH)

(73) Assignee: ITW Gema AG, St. Gallen (CH)

(*) Notice: Subject to any disclaimer, the term of this patent is extended or adjusted under 35 U.S.C. 154(b) by 0 days.

(21) Appl. No.: 09/323,025

(22) Filed: Jun. 1, 1999

(30) Foreign Application Priority Data

Jun. 3, 1998 (CH) ........................................ 198 24 802

(51) Int. Cl.[7] ........................................ G05D 11/03
(52) U.S. Cl. ........................ 137/889; 137/888; 137/890
(58) Field of Search ........................ 137/888, 889, 137/890, 895

(56) References Cited

U.S. PATENT DOCUMENTS

| | | |
|---|---|---|
| 3,881,653 | 5/1975 | Birckhead . |
| 4,114,810 | 9/1978 | Masuda . |
| 4,941,778 | 7/1990 | Lehmann . |
| 4,951,713 * | 8/1990 | Jordan et al. ........................ 137/895 |
| 5,105,843 * | 4/1992 | Condron et al. ........................ 137/13 |

FOREIGN PATENT DOCUMENTS

| | | |
|---|---|---|
| 1 266 685 | 4/1968 | (DE) . |
| 1 922 889 | 11/1972 | (DE) . |
| 26 42 587 | 4/1977 | (DE) . |
| 35 28 137 | 4/1987 | (DE) . |
| 37 21 875 | 1/1989 | (DE) . |
| 39 26 624 | 2/1991 | (DE) . |
| 42 01 665 | 7/1993 | (DE) . |
| 43 19 726 | 12/1994 | (DE) . |
| 690 14 879 | 7/1995 | (DE) . |
| 44 46 798 | 6/1996 | (DE) . |
| 0 297 309 | 6/1988 | (EP) . |

* cited by examiner

*Primary Examiner*—Stephen M. Hepperle
(74) *Attorney, Agent, or Firm*—Lowe Hauptman Gilman & Berner, LLP

(57) ABSTRACT

A powder-conveying injector to move coating powder and wherein the jet catching duct(8) of the conveying jet nozzle (4) is made of glass.

6 Claims, 1 Drawing Sheet

CONVEYING INJECTOR

TECHNICAL FIELD

The invention relates to a powder-conveying injector to convey coating powders to a conveying injection nozzle.

BACKGROUND ART

Injectors of this kind comprise a conveying jet nozzle, a jet catching duct opposite and axially spaced from the nozzle, and a powder-aspirating aperture affixed to the powder jet nozzle or between it and the jet catching duct. Furthermore one or more apertures for additional air may be present at the conveying-jet nozzle or between it and the jet catching duct or downstream of the latter. Injectors of this kind are known in various embodiments from the German patent documents 1,266,685; 1,922,889 and C2 42 01 665. The jet catching duct is frequently also called "catching nozzle".

The known injectors incur the drawback that the airflow and the powder particles wear down the jet catching duct. As a result, not only must the jet catching duct be exchanged frequently, but also, depending on the rate of wear, the volumetric powder flow (quantity of powder conveyed per unit time) will change, entailing non-uniform coating thicknesses of a workpiece being coated. The known jet catching ducts are made of metal or plastic. Metal ducts are is disadvantageous in that the powder particles tend to adhere and incipiently sinter at the duct wall. As a result the cross-section of the guiding duct varies and so does the volumetric powder flow. Plastics offer better slippage than metal, and typically those plastics are selected for which the powder particles show minimal adhesive friction. But in this design as well powder particle accretion and sintering onto the plastic duct walls cannot always be reliably avoided. Moreover plastics are "softer" than metal and accordingly suffer more from wear.

An objective of the invention is to achieve a lesser rate of wear of the jet catching duct and reducing, or even completely avoiding accretions and sintering onto the duct of powder particles.

SUMMARY OF THE INVENTION

The invention solves this problem in that the jet catching duct is made of glass with a smooth duct surface at least in those zones of the jet catching duct where a jet of powder conveying air impinges on it.

The invention offers the advantages that practically no sintering onto and practically no wear occurs in the jet catching duct. As a result, uniform powder conveyance is assured also a long span spans of operation.

One or more intakes of additional air may be present in the partial-vacuum zone of the injector and/or downstream from it in the powder duct transmitting the air-powder mixture.

BEST MODE FOR CARRYING OUT THE INVENTION

Figure 1:
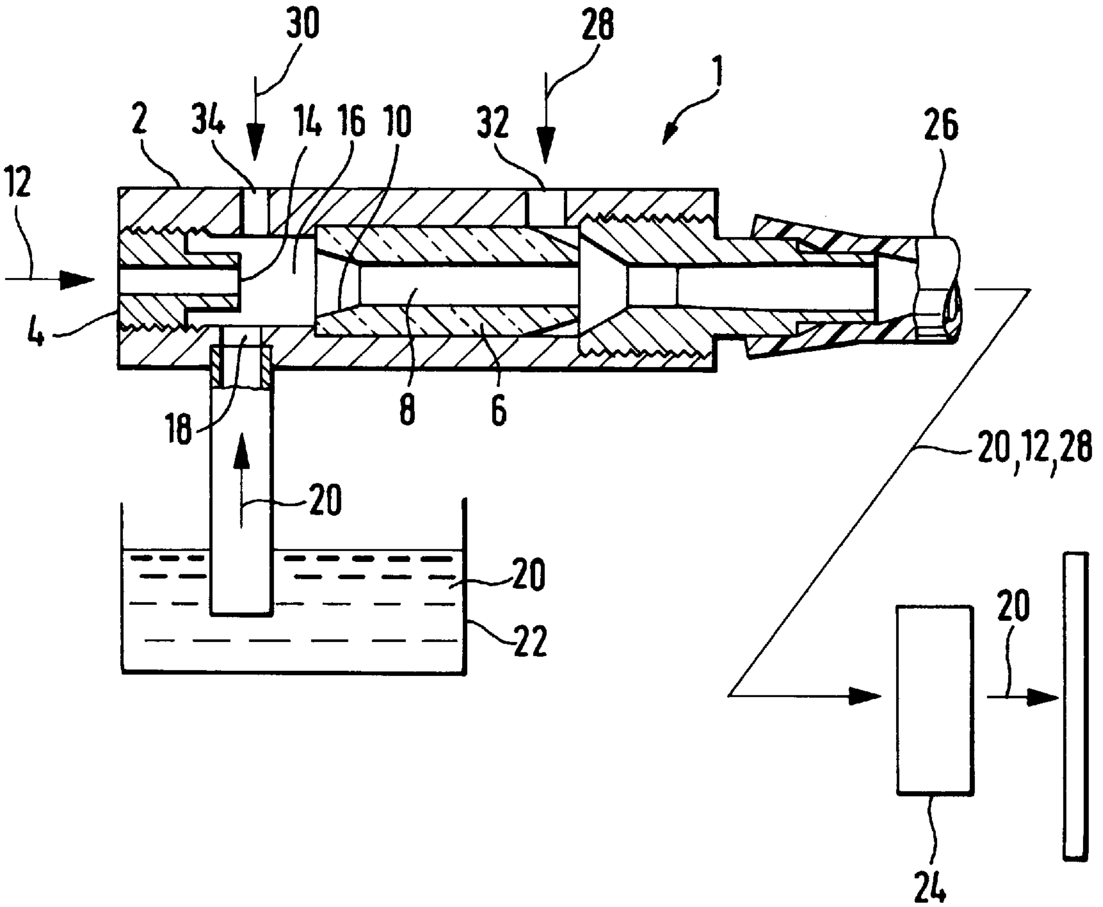
FIG. 1 is an axial section of a powder conveying injector of the invention used to convey coating powders.

The injector of FIG. 1 comprises a conveying jet nozzle 4 in a housing 2 and, at an axial distance from the nozzle 4, an axial catching nozzle 6 with a jet catching duct 8 which is frustoconically tapered at its upstream end zone 10. Downstream from a nozzle aperture 14 of the conveying jet nozzle 4, a conveying airflow 12 generates a partial vacuum in a partial-vacuum zone 16 of the housing 2 to aspirate coating powder 20 from a powder container 22 through a powder aspiration aperture 18. The aspirated coating powder 20 is moved by the conveying airflow 12 into the jet catching duct 8 where it partly impinges on the duct wall.

The jet catching duct 8 is composed of glass with a very smooth duct surface at least in the zone where powder particles impinge on the duct wall. Preferably the entire catch nozzle 6 is made of this glass. The glass should be as hard as possible, for instance being sapphire glass. Its duct surface should be as smooth as possible. An especially smooth surface can be achieved by glass blowing when manufacturing the glass.

The pneumatically moved powder 20 can be moved from the injector 1 to a further container or to a spray device 24, illustratively a manual or automatic spray gun with which the powder is sprayed on the objects to be coated.

The magnitude of volumetric flow of powder (quantity of powder moved per unit time) depends foremost on the magnitude of the partial vacuum in the partial-vacuum zone 16 and thereby primarily on the magnitude of the flow of conveying air 12. For small quantities of powder per unit time, the conveying air flow 12 may be so slight that some powder will deposit in the powder line 26 connecting the injector 1 to the powder recipient 24. Accordingly additional air 28 is conventionally introduced into the flow of powder-conveying air beyond the partial-vacuum zone 16 in order to regulate the total quantity of air required to convey powder in the powder line 26 without forming powder deposits in latter.

One or more intakes 32 for additional air 28 can be situated downstream of the catching nozzle 6 as shown in the drawing, or upstream of it. The feasibility of introducing additional air 30 upstream of the catching nozzle 6 is indicated by an arrow and a further intake 34.

Preferably the catching nozzle 6 is mounted exchangeable in the housing 2, for instance being plugged or screwed into it.

What is claimed is:

1. A powder conveying injector to convey coating powder, comprising a conveying jet nozzle (4), a jet catching duct (8) axially spaced from and in collinear alignment with said nozzle (4), and a powder aspirating aperture (18) in the conveying jet nozzle (4) or between said nozzle (4) and the jet catching duct (8), wherein the jet catching duct (8) is formed of glass with a smooth duct surface at least in a zone (10) that extends at an acute angle to a longitudinal duct axis and where said duct (8) is impinged by a jet of powder-conveying air.

2. A powder conveying injector to convey coating powder, comprising a conveying let nozzle (4), a let catching duct (8) axially spaced from and opposite said nozzle (4), and a powder aspirating aperture (18) in the conveying jet nozzle (4) or between said nozzle (4) and the let catching duct (8), wherein the let catching duct (8) is formed of glass with a smooth duct surface at least in a zone (10) where said duct (8) is impinged by a let of powder-conveying air, wherein the glass of the jet catching duct (8) is sapphire glass.

3. Powder conveying injector as claimed in claim 1, wherein a body (6) forming the jet catching duct (8) is exchangeably inserted into a housing containing said jet nozzle (4).

4. Powder conveying injector as claimed in claim 1, wherein the jet catching duct zone (8) is of a frustoconical cross-section at its upstream end (10) tapering in the direction of flow.

5. A powder conveying injector to convey coating powder, comprising a conveying jet nozzle (4), a jet catching duct (8) axially spaced from and opposite said nozzle (4), and a powder aspirating aperture (18) in the conveying jet nozzle (4) or between said nozzle (4) and the let catching duct (8), wherein the jet catching duct (8) is formed of glass with a smooth duct surface at least in a zone (10) where said duct (8) is impinged by a jet of powder-conveying air, wherein at least one intake (32,34) of additional air is situated downstream of the jet catching nozzle (4).

6. Powder-conveying injector as claimed in claim 5, wherein at least one intake (32) of additional air is situated downstream of the zone of the jet catching duct (8) which is made of glass.

* * * * *

UNITED STATES PATENT AND TRADEMARK OFFICE

CERTIFICATE OF CORRECTION

PATENT NO. : 6,196,269
DATED : June 1, 1999
INVENTOR(S) : Hans P. Michael

It is certified that error appears in the above-identified patent and that said Letters Patent is hereby corrected as shown below:

Title page,
Item [30], Foreign Application Priority Data

June 3, 1998 (DE) 198 24 802.4 --

Signed and Sealed this

Twenty-third Day of October, 2001

*Attest:*

Nicholas P. Godici

NICHOLAS P. GODICI

*Attesting Officer* *Acting Director of the United States Patent and Trademark Office*